United States Patent
Lee et al.

(10) Patent No.: US 11,095,071 B2
(45) Date of Patent: Aug. 17, 2021

(54) CONNECTOR, ELECTRONIC COMPONENT, AND ELECTRONIC DEVICE

(71) Applicant: HUAWEI TECHNOLOGIES CO., LTD., Shenzhen (CN)

(72) Inventors: Chiengchang Lee, Shenzhen (CN); Pan He, Wuhan (CN); Yong Chen, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/498,384

(22) PCT Filed: May 31, 2017

(86) PCT No.: PCT/CN2017/086720
§ 371 (c)(1),
(2) Date: Sep. 26, 2019

(87) PCT Pub. No.: WO2018/176630
PCT Pub. Date: Oct. 4, 2018

(65) Prior Publication Data
US 2021/0111510 A1   Apr. 15, 2021

(30) Foreign Application Priority Data

Mar. 29, 2017  (CN) .......................... 201710198378.0

(51) Int. Cl.
*H01R 13/62* (2006.01)
*G06F 1/16* (2006.01)
(Continued)

(52) U.S. Cl.
CPC ....... *H01R 13/6205* (2013.01); *G06F 1/1662* (2013.01); *H01R 13/24* (2013.01); *H01R 13/635* (2013.01); *H01R 13/639* (2013.01)

(58) Field of Classification Search
CPC .... H01R 13/6205; H01R 13/24; H01R 13/62; H01R 13/20; H01R 13/635; G01F 1/1654; G01F 1/1662; G01F 1/1669
See application file for complete search history.

(56) References Cited

U.S. PATENT DOCUMENTS 7,541,907 B2 * 6/2009 Wang .................... G06F 1/1632
335/214
8,289,115 B2 * 10/2012 Cretella, Jr. .............. G06F 9/00
335/219
(Continued)

FOREIGN PATENT DOCUMENTS

CN         1725567 A      1/2006
CN       203386106 U      1/2014
(Continued)

OTHER PUBLICATIONS

Office Action dated Dec. 8, 2020, issued in JP Application No. 2019-553174 and English translation, total 8 pages.

*Primary Examiner* — Harshad C Patel

(57) ABSTRACT

A connector is configured to connect a first electronic component and a second electronic component, and includes: an enclosure, where a through-hole is disposed on the enclosure; a pin assembly disposed in the enclosure, the pin assembly is movable relative to the enclosure; a flexible printed circuit board, where one end of the flexible printed circuit board is connected to the pin, and the other end is configured to be connected to a circuit board in the first electronic component; a plug structure configured to be detachably connected to the second electronic component; and a driving assembly, where when the second electronic component is connected to the plug structure, the driving assembly is able to drive the pin assembly to move relative to the enclosure in a direction close to the through-hole, so (Continued)

that the pin extends out of the through-hole and is connected to the second electronic component.

20 Claims, 6 Drawing Sheets

(51) Int. Cl.
*H01R 13/24* (2006.01)
*H01R 13/635* (2006.01)
*H01R 13/639* (2006.01)

(56) References Cited

U.S. PATENT DOCUMENTS

| | | | | |
|---|---|---|---|---|
| 8,531,827 | B2* | 9/2013 | Huang | G06F 1/1671 |
| | | | | 361/679.29 |
| 8,599,542 | B1* | 12/2013 | Healey | G06F 1/1626 |
| | | | | 361/679.17 |
| 8,672,228 | B1 | 3/2014 | Saini | |
| 8,853,998 | B2* | 10/2014 | Aldana | G06F 1/1632 |
| | | | | 320/107 |
| 8,920,178 | B2* | 12/2014 | Wei | G06F 1/1626 |
| | | | | 439/38 |
| 9,135,478 | B2* | 9/2015 | Burns | G06K 7/0021 |
| 9,147,966 | B2* | 9/2015 | An | H01R 13/6205 |
| 9,483,076 | B2* | 11/2016 | Liang | G06F 1/1632 |
| 9,678,542 | B2* | 6/2017 | Whitt, III | G06F 1/1681 |
| 9,690,332 | B2* | 6/2017 | Liu | G06F 1/1669 |
| 9,905,964 | B2* | 2/2018 | Degner | H01R 13/6205 |
| 9,997,286 | B2* | 6/2018 | Herman | H01F 7/0252 |
| 10,050,658 | B2* | 8/2018 | Carnevali | G06F 1/1628 |
| 10,082,840 | B2* | 9/2018 | Esmaeili | G06F 1/1669 |
| 10,281,952 | B2* | 5/2019 | Li | A45C 13/1069 |
| 2004/0209489 | A1* | 10/2004 | Clapper | H01R 13/6205 |
| | | | | 439/39 |
| 2006/0256516 | A1* | 11/2006 | Cho | G06F 1/1654 |
| | | | | 361/679.29 |
| 2010/0321877 | A1* | 12/2010 | Moser | G06F 1/1616 |
| | | | | 361/679.29 |
| 2013/0039000 | A1* | 2/2013 | Vicente, Jr. | G06F 1/1681 |
| | | | | 361/679.41 |
| 2013/0170126 | A1* | 7/2013 | Lee | G06F 1/1669 |
| | | | | 361/679.17 |
| 2014/0043743 | A1* | 2/2014 | Liang | G06F 1/1613 |
| | | | | 361/679.09 |
| 2014/0133080 | A1* | 5/2014 | Hwang | G06F 1/1632 |
| | | | | 361/679.17 |
| 2014/0321049 | A1 | 10/2014 | Ashcraft et al. | |
| 2014/0321070 | A1* | 10/2014 | Wang | G06F 1/1632 |
| | | | | 361/748 |
| 2014/0328014 | A1* | 11/2014 | Lan | G06F 1/1669 |
| | | | | 361/679.27 |
| 2015/0138721 | A1* | 5/2015 | Liang | F16M 13/00 |
| | | | | 361/679.44 |
| 2017/0220076 | A1* | 8/2017 | Gerbus | G06F 1/1632 |

FOREIGN PATENT DOCUMENTS

| | | |
|---|---|---|
| CN | 103579847 A | 2/2014 |
| CN | 203930687 U | 11/2014 |
| CN | 205750650 U | 11/2016 |
| EP | 2541367 A2 | 1/2013 |
| JP | H10112367 A | 4/1998 |
| JP | 2007123264 A | 5/2007 |
| JP | 2008071704 A | 3/2008 |

* cited by examiner

CONNECTOR, ELECTRONIC COMPONENT, AND ELECTRONIC DEVICE

CROSS REFERENCE TO RELATED APPLICATION(S)

This application is a national stage of International Application No. PCT/CN2017/086720, filed on May 31, 2017, which claims priority to Chinese Patent Application No. 201710198378.0, filed on Mar. 29, 2017. Each of these applications are hereby incorporated by reference in their entireties.

TECHNICAL FIELD

This application relates to the field of electronic product technologies, and in particular, to a connector, an electronic component, and an electronic device.

BACKGROUND

To satisfy office requirements for individuals, a keyboard connected to a tablet computer is designed. A product formed by a tablet computer and a keyboard in a combined manner or in a detachable manner is referred to as a two-in-one computer. A tablet computer and a keyboard in an existing two-in-one computer may be connected by using a physical connector (or through Bluetooth), as a non-limiting example.

For example, FIG. 1 shows a keyboard 01 used in a two-in-one computer and having a physical connector in the related art. The physical connector is disposed on a rear edge of the keyboard 01. The physical connector includes a pin assembly 011 fixed on an upper surface of the keyboard 01. A pin protrudes from the upper surface of the keyboard 01, and the pin assembly 011 includes a plurality of pins (e.g., Pogo Pin) arranged along a straight line. A limiting rod 012 is disposed on each side of the pin assembly 011, and the limiting rods 012 are configured to position the keyboard 01 and a tablet computer. Magnets (not shown in the figure) are disposed at joints between the keyboard 01 and the tablet computer. When the tablet computer gets close to the keyboard 01, a connection point of the tablet computer and the pin assembly 011 on the keyboard 01 are first positioned by using the limiting rod 012; and after alignment, the tablet computer is made closer to the keyboard 01. In this way, the keyboard 01 is mechanically connected to the tablet computer under attractive force between the magnets. When the tablet computer is mechanically connected to the keyboard 01, the connection point of the tablet computer touches the pins on the keyboard 01, to implement an electrical connection between the keyboard 01 and the tablet computer.

Because the pin assembly 011 protrudes from the upper surface of the keyboard 01, the pins may be easily damaged in storage and transportation processes. Consequently, the keyboard cannot be electrically connected to the tablet computer, and a problem of a keyboard failure is caused.

SUMMARY

Embodiments of this application provide a connector, an electronic component, and an electronic device, to resolve a prior-art problem that a pin protruding from an upper surface of a keyboard may be easily damaged.

To achieve the foregoing objective, the following technical solutions are used in the embodiments of this application.

According to a first aspect, this application provides a connector, configured to connect a first electronic component and a second electronic component. The connector includes: an enclosure, where a through-hole is disposed on the enclosure; a pin assembly, where the pin assembly is disposed in the enclosure, the pin assembly is movable relative to the enclosure, the pin assembly includes a fixing frame, and a pin is disposed on the fixing frame; a flexible printed circuit board, where one end of the flexible printed circuit board is connected to the pin, and the other end of the flexible printed circuit board is configured to be connected to a circuit board in the first electronic component; a plug structure, where the plug structure is configured to be detachably connected to the second electronic component; and a driving assembly, where when the second electronic component is connected to the plug structure, the driving assembly is able to drive the pin assembly to move relative to the enclosure in a direction close to the through-hole, so that the pin extends out of the through-hole and is connected to the second electronic component.

According to the connector provided in this embodiment of this application, the pin assembly is movable relative to the enclosure; and during storage and transportation, the pin assembly is disposed in the enclosure, so that the enclosure can protect the pin assembly from being easily damaged. When the connector is applied to a two-in-one tablet computer, if the second electronic component is a tablet computer, and the first electronic component is a keyboard, after the tablet computer is connected to the plug structure, the driving assembly drives the pin assembly to move close to the through-hole, so that the pin extends out of the through-hole and is connected to the tablet computer, so as to connect the tablet computer and the keyboard.

Optionally, the driving assembly includes a first magnet fixed on the fixing frame. The first magnet is configured to match and be connected to a second magnet in the second electronic component. The through-hole is opened on an upper cover of the enclosure. When the second electronic component is connected to the plug structure, attractive force between the first magnet and the second magnet is able to drive the first magnet and the pin assembly to move close to the through-hole. In this scheme in which a connection is implemented by magnetic attraction, a structure is simple, and the connection is reliable.

Optionally, a magnetic attraction component is disposed on a position that is corresponding to the first magnet and that is on a lower cover of the enclosure. When the second electronic component is connected to the plug structure, the attractive force between the first magnet and the second magnet is greater than attractive force between the first magnet and the magnetic attraction component. When the pin assembly is located in the enclosure, the magnetic attraction component and the second magnet are attracted together, so that the pin assembly and the lower cover of the enclosure are connected reliably without shaking, to avoid causing a problem of misalignment between the pin assembly and the through-hole on the enclosure.

Optionally, an elastic component is disposed between the pin assembly and the enclosure. The elastic component applies force to the pin assembly to cause the pin assembly to move close to the lower cover. When the second electronic component is disengaged from the plug structure, the elastic component can pull the pin assembly back into the enclosure, and the elastic component is fixedly connected to the pin assembly and the enclosure, so that the pin is accurately aligned with the through-hole.

Optionally, the elastic component is a spring. One end of the spring is connected to the upper cover of the enclosure, and the other end is connected to the fixing frame. When the pin on the fixing frame extends out of the through-hole, the spring is in a compressed state, and the spring applies force to the pin assembly to cause the pin assembly to move close to the lower cover. When the second electronic component is disengaged from the plug structure, the first magnet is also disengaged from the second magnet, and restoration force of the spring pushes the pin assembly back into the enclosure. Therefore, a structure is simple.

Optionally, the elastic component is a spring. One end of the spring is connected to the lower cover of the enclosure, and the other end is connected to the fixing frame. When the pin on the fixing frame extends out of the through-hole, the spring is in a stretched state, and the spring applies force to the pin assembly to cause the pin assembly to move close to the lower cover. When the second electronic component is disengaged from the plug structure, the first magnet is also disengaged from the second magnet, and restoration force of the spring pulls the pin assembly back into the enclosure. Therefore, a structure is simple.

Optionally, the driving assembly includes a motor connected to the fixing frame by using a transmission structure and a Hall switch connected to the motor. A second magnet is disposed in the second electronic component. When the second magnet enters a sensing range of the Hall switch, the Hall switch sends a start signal to the motor, so that the motor drives the pin assembly to move close to the through-hole. The pin assembly is sensitive, and therefore the pin can quickly extend.

Optionally, a linear guide structure is disposed in the enclosure. The linear guide structure is configured to guide the fixing frame in moving in a direction perpendicular to the upper cover. In this way, a moving track of the fixing frame is limited by the linear guide structure, so that the pin can accurately extend out of the through-hole.

Optionally, the linear guide structure includes a guide frame fixed on a lower surface of the upper cover, a side wall of the guide frame extends in a direction perpendicular to the upper cover, and the fixing frame is disposed in and matches the guide frame. In this way, a moving direction of the fixing frame is limited by the guide frame. A structure is simple, and therefore mounting is convenient.

Optionally, the fixing frame is hinged to the enclosure by a rotating shaft. The driving assembly is able to drive the fixing frame to rotate close to the through-hole and is able to drive the fixing frame to rotate away from the through-hole. A rotation manner is convenient, and no limiting device is needed, and therefore a structure is simple.

Optionally, the plug structure includes a limiting rod disposed on the fixing frame. The limiting rod is in parallel with the pin, and a length of the limiting rod is greater than a length of the pin. A position for connecting the first electronic component and the second electronic component is determined by using the limiting rod, so that both of them are positioned accurately.

Optionally, the plug structure includes a positioning groove disposed on the upper cover, and the pin is disposed in the positioning groove. The positioning groove is configured to match a lower end of the second electronic component. A mounting position of the second electronic component on the first electronic component is limited by the positioning groove. In this case, no limiting rod is needed, and therefore the first electronic component has an improved appearance.

Optionally, the second magnet is an electromagnet, and a Hall switch is disposed in the second electronic component. When the first magnet enters a sensing range of the Hall switch, the Hall switch sends a signal to a control circuit of the electromagnet, so that the control circuit of the electromagnet is powered on. In this way, it is easy and convenient to disengage the first magnet from the second magnet.

According to a second aspect, this application provides an electronic component, including the connector according to any one of the foregoing technical solutions.

According to a third aspect, this application provides an electronic device, including a first electronic component and a second electronic component. The first electronic component and the second electronic component are connected by using the connector according to any one of the foregoing technical solutions, and the first electronic component and the second electronic component are connected reliably.

Optionally, the first electronic component includes the connector according to any one of the foregoing technical solutions.

Optionally, the first electronic component is a keyboard, and the second electronic component is a tablet computer; or the first electronic component is a tablet computer, and the second electronic component is a keyboard.

DESCRIPTION OF EMBODIMENTS

The following describes the technical solutions in the embodiments of this application with reference to the accompanying drawings in the embodiments of this application.

In descriptions of this application, a direction or a position relationship indicated by terms such as "center", "upper", "lower", "front", "back", "left", "right", "vertical", "horizontal", "top", "bottom", "inside", or "outside" is a direction or a position relationship shown based on the accompanying drawings, is merely used to describe this application and simplify the descriptions, but is not intended to specify or imply that an indicated apparatus or element needs to have a particular direction, needs to be constructed in a particular direction structure, and needs to be operated in a particular direction, and therefore cannot be construed as a limitation on this application.

In the descriptions of this application, it should be noted that terms "mount", "connect", and "connection" should be understood in a broad sense unless otherwise clearly specified and limited. For example, a connection may be a fixed connection, may be a detachable connection, or may be a contact connection or an integrated connection. Persons of ordinary skill in the art may understand specific meanings of the terms in this application based on a specific case.

An electronic device in the embodiments of this application includes a first electronic component and a second electronic component. The first electronic component or the second electronic component includes a connector, and the first electronic component and the second electronic component can be connected together by using the connector, so that the two electronic components are used as one electronic device, for example, a two-in-one computer. In this case, the first electronic component may be a keyboard, and the second electronic component may be a tablet computer. It should be noted that the specified keyboard and tablet computer are merely a simple example. Actually, it may be assumed that the first electronic component is a tablet computer and the second electronic component is a keyboard, and a connection manner is the same as a connection manner in the assumption that the first electronic component is a keyboard and the second electronic component is a tablet computer.

Figure 1:
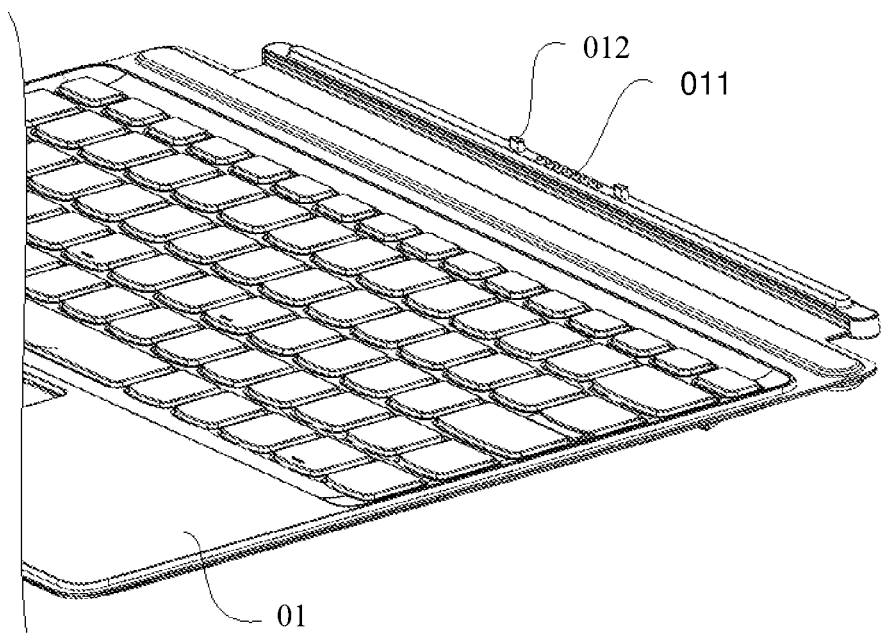
FIG. 1 is an example schematic structural diagram of a keyboard in a two-in-one computer in the related art.
Figure 2:
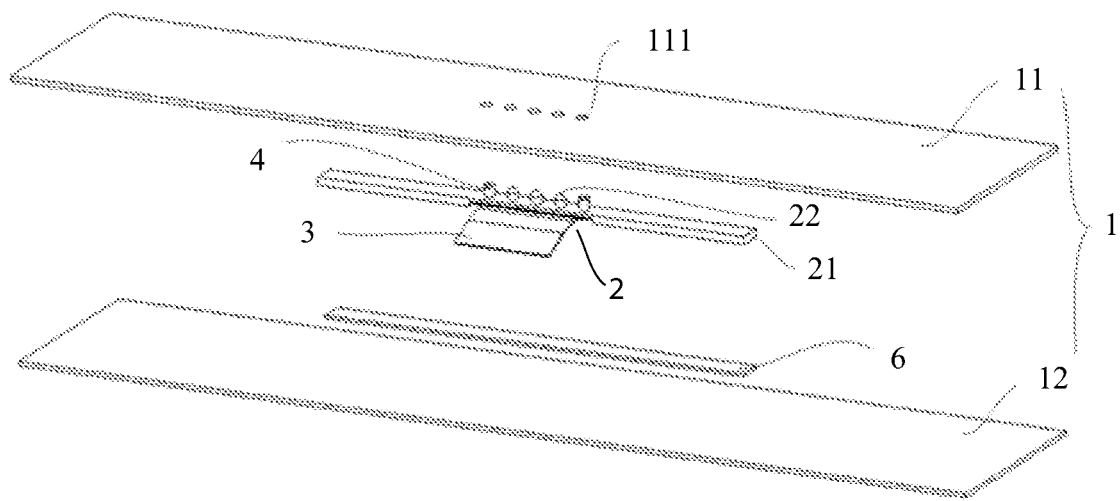
FIG. 2 is a non-limiting example structural breakdown diagram of a connector according to an embodiment of this application.
Figure 3:
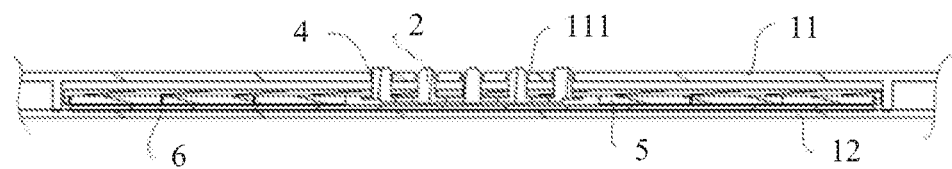
FIG. 3 is a non-limiting example partial schematic diagram of a pin extending out of a through-hole in a connector according to an embodiment of this application.
Figure 4:
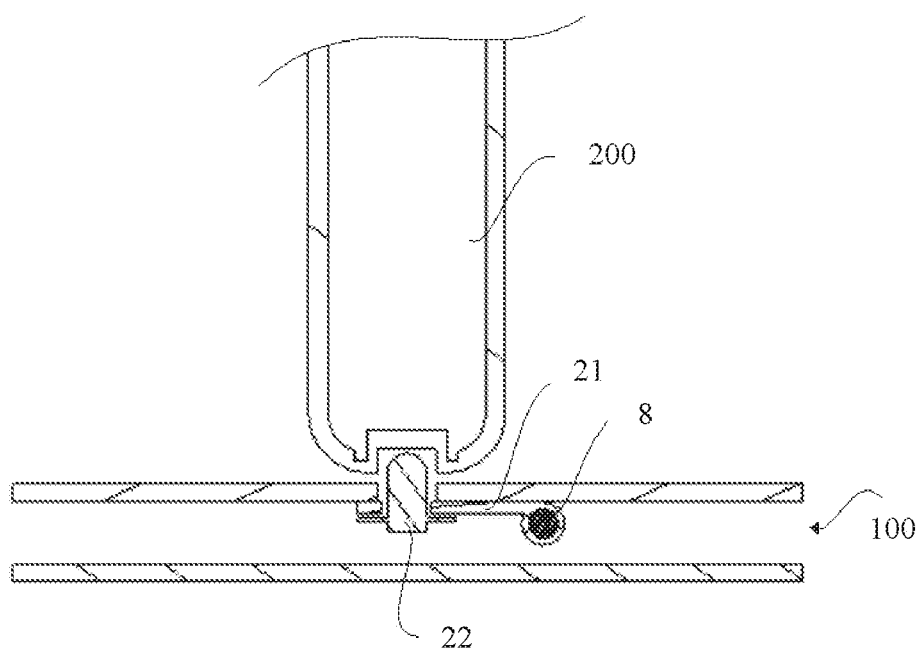
FIG. 4 is a non-limiting example partial schematic diagram of connecting a keyboard and a tablet computer by using a pin in a two-in-one computer according to an embodiment of this application.
Figure 5:
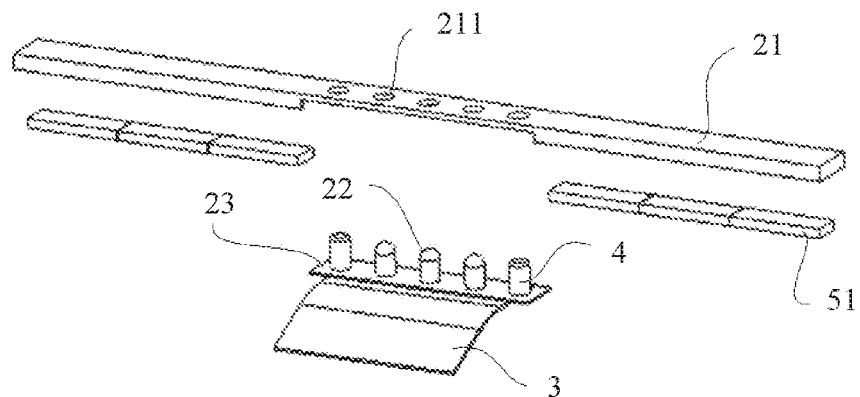
FIG. 5 is a non-limiting example structural breakdown diagram of a pin assembly in a connector according to an embodiment of this application.

That the electronic device is a two-in-one computer, the first electronic component is a keyboard, the second electronic component is a tablet computer, and the keyboard includes the connector is used as an example. FIG. 2 is a structural breakdown diagram of a connector according to an embodiment of this application. FIG. 3 is a partial schematic diagram of a pin extending out of a through-hole in a connector according to an embodiment of this application. FIG. 4 is a partial schematic diagram of connecting a keyboard and a tablet computer by using a pin in a two-in-one computer according to an embodiment of this application. FIG. 5 is a structural breakdown diagram of a pin assembly in a connector according to an embodiment of this application.

The following describes a structure of the connector with reference to FIG. 2 to FIG. 5.

The connector includes an enclosure 1 and a flexible printed circuit board 3. A through-hole 111 is disposed on the enclosure 1, a pin assembly 2 is disposed in the enclosure 1, and the pin assembly 2 is movable relative to the enclosure 1. The pin assembly 2 includes a fixing frame 21. A pin 22 is disposed on the fixing frame 21. One end of the flexible printed circuit board 3 is connected to the pin 22, and the other end of the flexible printed circuit board 3 is configured to be connected to a circuit board (not shown in the figure) in a keyboard 100. The connector further includes a plug structure 4 and a driving assembly 5. The plug structure 4 is configured to be detachably connected to a tablet computer 200. When the tablet computer 200 is connected to the plug structure 4, the driving assembly 5 is able to drive the pin assembly 2 to move relative to the enclosure 1 in a direction close to the through-hole 111, so that the pin 22 extends out of the through-hole 111 and is connected to the tablet computer 200, so as to combine the keyboard 100 and the tablet computer 200.

According to the connector provided in this embodiment of this application, the pin assembly 2 is movable relative to the enclosure 1. During storage and transportation, because the pin assembly 2 is disposed in the enclosure 1, the enclosure 1 can protect the pin assembly 2 from being easily damaged. The flexible printed circuit board in the connector is connected to the circuit board in the keyboard. When the tablet computer 200 is connected to the plug structure 4, the driving assembly 5 drives the pin assembly 2 to move relative to the enclosure 1 in a direction close to the through-hole 111, so that the pin 22 extends out of the through-hole 111 and is connected to the tablet computer 200, so as to connect the tablet computer 200 and the keyboard 100.

Figure 6:
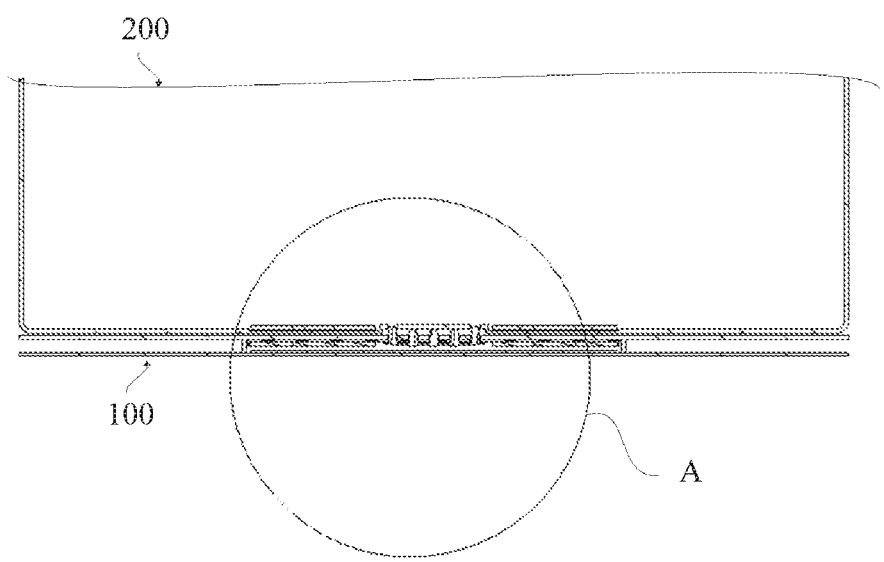
FIG. 6 is a non-limiting example partial schematic diagram of connecting a keyboard and a tablet computer by using a connector in a two-in-one computer according to an embodiment of this application.
Figure 7:
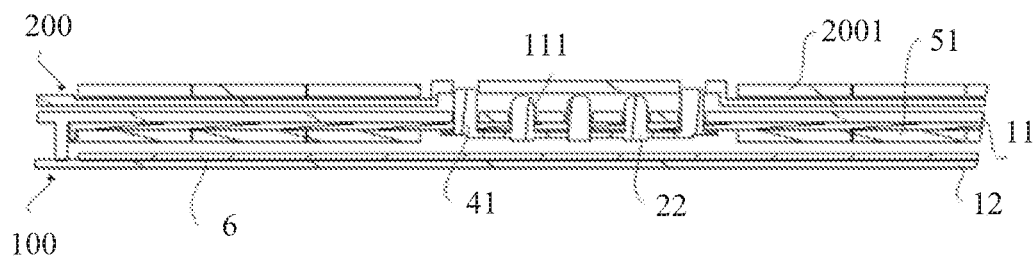
FIG. 7 is a non-limiting example partially enlarged diagram of FIG. 6.

FIG. 6 is a partial schematic diagram of connecting a keyboard and a tablet computer by using a connector in a two-in-one computer according to an embodiment of this application. FIG. 7 is a partially enlarged diagram of FIG. 6.

The driving assembly 5 in the foregoing implementation may have a plurality of structural composition schemes. For example, the driving assembly 5 includes a first magnet 51 fixed on the fixing frame 21. The first magnet 51 is configured to match and be connected to a second magnet 2001 in the tablet computer 200, and the through-hole 111 is opened on an upper cover 11 of the enclosure 1, as shown in FIG. 2, FIG. 6, and FIG. 7. When the tablet computer 200 is connected to the plug structure 4, the first magnet 51 and the second magnet 2001 are attracted together, to drive the first magnet 51 and the pin assembly 2 to move close to through-hole 111. In this manner in which driving is implemented by magnetic attraction, no transmission structure is needed, a structure is simple, and a connection is reliable. Optionally, the pin assembly 2 may move along a straight line or in a rotation manner. The first magnet 51 and the fixing frame 21 may be connected in a bonding manner or by using a special-purpose magnet fixer. The first magnet 51 is fixed to the magnet fixer, and the magnet fixer is fixedly connected to the fixing frame 21.

In addition, referring to FIG. 5, the pin assembly 2 includes a plurality of pins 22. The plurality of pins 22 are fixed on a support plate 23. The pins 22 are connected to the flexible printed circuit board 3 (e.g., FPC). A plurality of connection holes 211 are opened on positions on the fixing frame 21 that are corresponding to the pins 22. The pins 22 extend out of the connection holes 211, respectively, and the support plate 23 and the fixing frame 21 are bonded or fixed together by using a bolt.

When the tablet computer is removed from the keyboard, the first magnet 51 is disengaged from the second magnet 2001, and the pin assembly 2 and the first magnet 51 may fall down within the enclosure 1 under gravity. Therefore, the connector has a simple structure.

Optionally, referring to FIG. 2, a magnetic attraction component 6 is disposed on a lower cover 12 of the enclosure 1 in this embodiment of this application. When the tablet computer 200 is connected to the plug structure 4, attractive force between the first magnet 51 and the second magnet 2001 is greater than attractive force between the first magnet 51 and the magnetic attraction component 6. In this case, the attractive force between the first magnet 51 and the second magnet 2001 drives the pin 22 to extend out of the through-hole 111 and is connected to the tablet computer 200, as shown in FIG. 2 and FIG. 5 to FIG. 7. When the tablet computer 200 is disengaged from the plug structure 4, the second magnet 2001 is not within a magnetic force range of the first magnet 51, and the first magnet 51 and the magnetic attraction component 6 on the lower cover 12 of the enclosure 1 are attracted together. In this case, under both the magnetic force and gravity, the pin assembly 2 accelerates falling down within the enclosure 1, and a position of the pin assembly 2 is fixed relative to a position of the lower cover 12 of the enclosure 1. This can prevent the pin 22 from extending out of the through-hole 111 or the pin assembly 2 from generating abnormal noise in the enclosure 1 due to shaking when a user moves or turns over the keyboard. In addition, this can avoid a problem of misalignment between the pin assembly 2 and the through-hole 111 on the enclosure 1 when the pin assembly 2 shakes in the enclosure 1 due to transportation or a hit. The magnetic attraction component 6 may be a magnet whose magnetism is different from that of the first magnet 51, and may alternatively be made of iron materials.

Optionally, an elastic component may be disposed between the pin assembly 2 and the enclosure 1 to replace the magnetic attraction component 6. The elastic component applies force to the pin assembly 2 to cause the pin assembly 2 to move close to the lower cover 12 of the enclosure 1. The elastic component may push the pin assembly 2 back into the enclosure 1, and the pin assembly 2 is fixedly connected to the enclosure 1, and therefore, a position of the pin assembly 2 is limited. This avoids a problem of misalignment between the pin assembly 2 and the through-hole 111 on the enclosure 1, and noise is low in an action process.

It should be further noted that, optionally, the elastic component is a spring. One end of the spring is connected to the upper cover 11 of the enclosure 1, and the other end is connected to the fixing frame 21. When the fixing frame 21 extends out of the through-hole 111, the spring is in a compressed state, and the spring applies force to the pin assembly 2 to cause the pin assembly 2 to move close to the lower cover 12. Alternatively, one end of the spring is connected to the lower cover 12 of the enclosure 1, and the other end is connected to the fixing frame 21. When the fixing frame 21 extends out of the through-hole 111, the spring is in a stretched state, and the spring applies force to the pin assembly 2 to cause the pin assembly 2 to move close to the lower cover 12. In both the foregoing implementations, the spring may be fixedly connected to the enclosure 1. When the tablet computer 200 is disengaged from the plug structure 4, restoration force of the spring pushes the pin assembly 2 back into the enclosure 1. Therefore, a structure is simple, and mounting is convenient.

Certainly, in addition to the scheme in which the pin assembly 2 is driven to move in the manner in which driving is implemented by magnetic attraction, this application further provides another embodiment. The driving assembly 5 includes a motor (not shown in the figure) connected to the fixing frame 21 by using a transmission structure and a Hall switch (not shown in the figure) connected to the motor; and the second magnet 2001 is still disposed in the tablet computer 200. When the second magnet 2001 enters a sensing range of the Hall switch, the Hall switch sends a start signal to the motor, so that the motor drives the pin assembly 2 to move close to the through-hole 111. In other words, the pin 22 extends out of the through-hole 111, as shown in FIG. 7. In this manner in which the motor drives the pin assembly 2 to move, the pin assembly 2 moves more stably. In addition, the pin assembly 2 is sensitive, and therefore the pin can quickly extend. The motor may drive the pin assembly 2 to move in a rotation manner or move along a straight line.

When the pin assembly 2 moves along a straight line, the pin assembly 2 may easily deviate because of a problem such as mechanical assembly, motor vibration, or unequal magnetic force of the magnets when a driving structure drives the pin assembly 2 to move. When extending out of the through-hole 111, the pin 22 needs to be aligned with the through-hole 111. If position deviation of the pin 22 is high, the pin 22 cannot extend out of the through-hole 111 for connection to the tablet computer 200. Optionally, in the embodiments of this application, a linear guide structure is disposed in the enclosure 1. The linear guide structure drives the fixing frame 21 to move in a direction perpendicular to the upper cover 11. This can prevent position deviation of the fixing frame 21. In other words, the pin 22 on the fixing frame 21 can accurately extend out of the through-hole 111.

Figure 8:
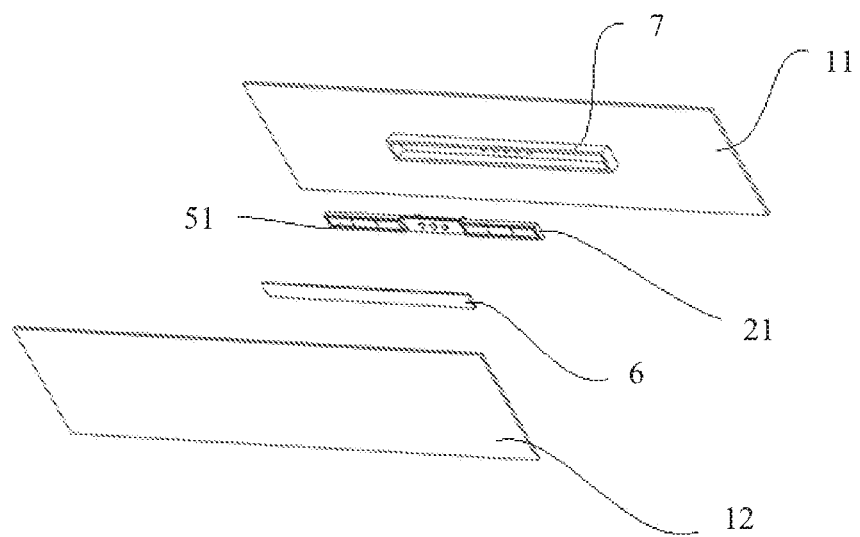
FIG. 8 is a non-limiting example structural breakdown diagram of another pin assembly in a connector according to an embodiment of this application.
Figure 9:
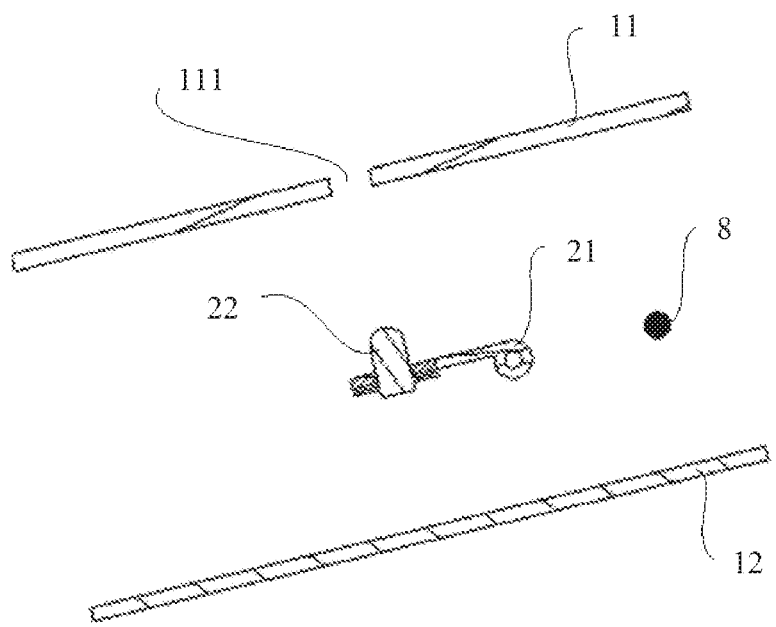
FIG. 9 is a non-limiting example structural breakdown diagram of a pin assembly that rotates in a connector according to an embodiment of this application.
Figure 10:
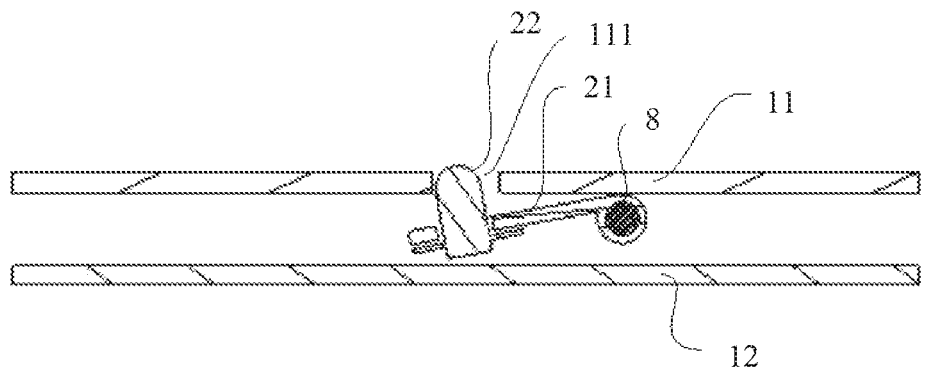
FIG. 10 is a non-limiting example schematic assembly diagram of a pin assembly that rotates in a connector according to an embodiment of this application.

FIG. 8 is a structural breakdown diagram of another pin assembly in a connector according to an embodiment of this application. FIG. 9 is a structural breakdown diagram of a pin assembly that rotates in a connector according to an embodiment of this application. FIG. 10 is a schematic assembly diagram of a pin assembly that rotates in a connector according to an embodiment of this application.

Referring to FIG. 5 and FIG. 8, the linear guide structure includes a guide frame 7 fixed on a lower surface of the upper cover 11, a side wall of the guide frame 7 extends in a direction perpendicular to the upper cover 11, and the fixing frame 21 is disposed in and matches the guide frame 7, so that the fixing frame 21 can move only straight up and down in a direction perpendicular to the upper cover 11, to avoid deviation of the pin 22 on the fixing frame 21. The guide frame 7 has a simple structure, and therefore mounting is convenient. Optionally, the linear guide structure may be a plurality of guide rails disposed on the lower surface of the upper cover 11. The guide rails extend in a direction perpendicular to the upper cover 11. Correspondingly, a plurality of guide posts are disposed surrounding edges of the fixing frame 21. The guide posts slide and are engaged with the guide rails, so that the fixing frame 21 moves in a specified direction. Optionally, the linear guide structure may further include one or more guide posts between the upper cover 11 and the lower cover 12 of the enclosure 1. A lower end of the guide post is fixedly connected to the lower cover 12, a matching hole matching the guide post is opened on the fixing frame 21, the guide post extends out of the matching hole and is fixedly connected to the upper cover 11, and the guide post extends in a direction perpendicular to the upper cover 11, so that the fixing frame 21 needs to move up and down in an extending direction of the guide post.

Optionally, the fixing frame 21 may alternatively be designed to move in a rotation manner. Referring to FIG. 4, FIG. 9, and FIG. 10, in the embodiments of this application, the fixing frame 21 is hinged to the enclosure 1 by a rotating shaft 8. The driving assembly 5 is able to drive the fixing frame 21 to rotate close to the through-hole 111, so that the pin 22 extends out of the through-hole 111; or the driving assembly 5 is able to drive the fixing frame 21 to rotate away from the through-hole 111, so that the pin 22 retracts into the enclosure 1. The rotation manner is convenient, and no limiting device is needed, and therefore a structure is simple. In addition, when the pin 22 extends out of the through-hole 111 in the rotation manner, an angle of the pin 22 also changes, and consequently, the pin 22 may easily hit an inner wall of the through-hole 111. Therefore, the through-hole 111 needs to be designed to be large, to avoid the pin 22.

Optionally, referring to FIG. 7, the plug structure 4 includes a limiting rod 41 disposed on the fixing frame 21. The limiting rod 41 is disposed parallel with the pin 22, and a length of the limiting rod 41 is greater than a length of the pin 22. Correspondingly, a positioning hole matching the limiting rod 41 is disposed on the tablet computer 200. If a plurality of pins 22 are distributed along a straight line, one limiting rod 41 is disposed on each of two sides of an extending direction along the pin 22, as shown in FIG. 5. When the tablet computer 200 is connected to the keyboard 100, the limiting rod 41 first extends into the positioning hole on the tablet computer 200, and then a contact connection point on the tablet computer 200 touches the pin 22 in an extending direction of the positioning hole, to implement an electrical connection between the tablet computer 200 and the keyboard 100. It can be convenient to accurately position the tablet computer 200 and the keyboard 100 by using the plug structure 4, and mechanical connection strength between the tablet computer 200 and the keyboard 100 is further enhanced.

Figure 11:
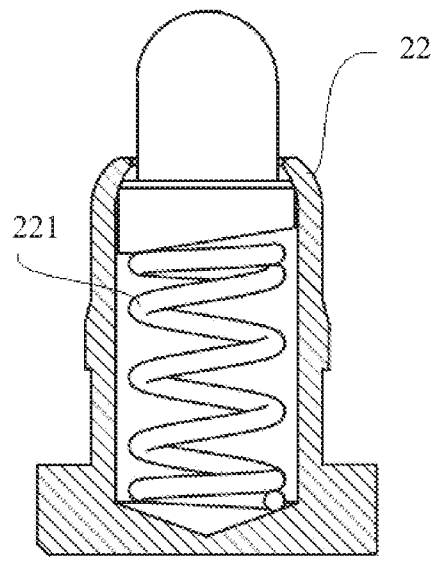
FIG. 11 is a non-limiting example schematic structural diagram of a pin in a connector according to an embodiment of this application.
Figure 12:
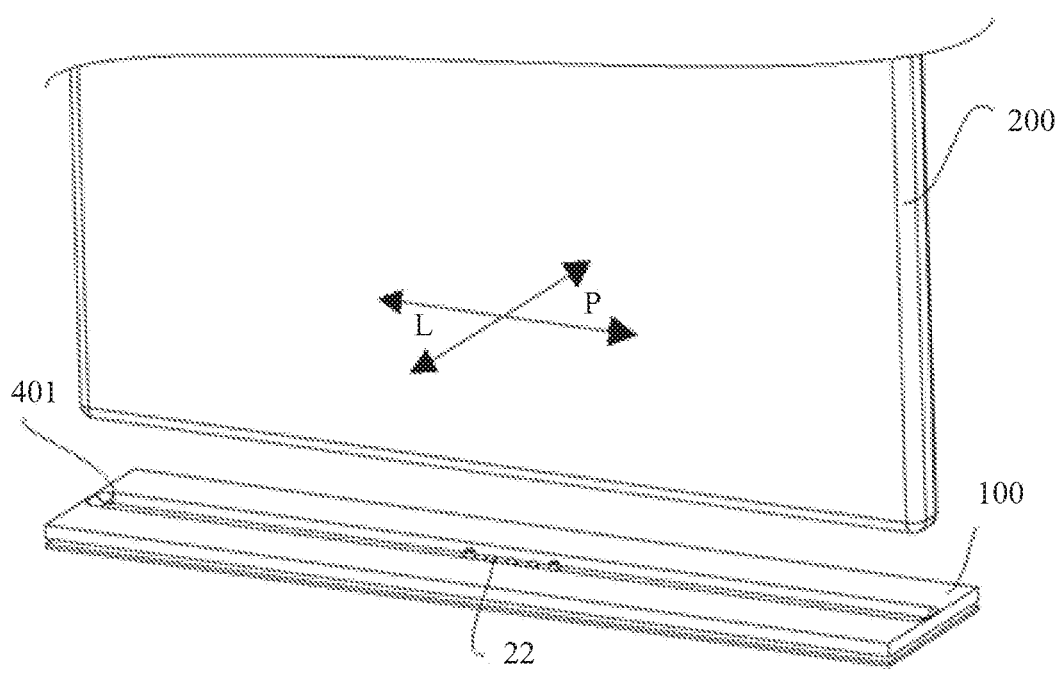
FIG. 12 is a non-limiting example schematic structural diagram of a plug structure that is a positioning groove in a connector according to an embodiment of this application.

FIG. 11 is a schematic structural diagram of a pin in a connector according to an embodiment of this application. FIG. 12 is a schematic structural diagram of a plug structure that is a positioning groove in a connector according to an embodiment of this application.

Referring to FIG. 11, a compression spring 221 is disposed in the pin 22. After the pin 22 touches the contact connection point on the tablet computer 200, the tablet computer 200 further presses the compression spring 221, to compress the compression spring 221 in the pin 22, until the tablet computer 200 and the keyboard 100 are positioned and connected reliably.

Optionally, the foregoing plug structure 4 may alternatively use another scheme. For example, the plug structure 4 includes a positioning groove 401 disposed on the upper cover 11. A length and a width of a lower end of the positioning groove 401 are the same as a length and a width of a lower end of the tablet computer 200, and the pin 22 is disposed in the positioning groove 401. As shown in FIG. 12, when the tablet computer 200 is connected to the plug structure 4, the lower end of the tablet computer 200 may match and extend into the positioning groove 401, and the lower end of the tablet computer 200 is exactly inserted into the positioning groove 401, and therefore, degrees of freedom of the tablet computer 200 in front, back, left, and right directions (front and back directions are directions indicated by L in FIG. 12, and left and right directions are directions indicated by P in FIG. 12) are limited, to implement an accurate connection between the connection point on the tablet computer 200 and the pin 22 on the keyboard 100. The positioning groove 401 does not protrude from an upper surface of the keyboard 100. Therefore, no limiting rod 41 is disposed, an appearance is more beautiful, and positioning is more convenient. Certainly, the plug structure 4 may alternatively use a scheme of combining the limiting rod 41 and the positioning groove 401, so that the keyboard 100 and the tablet computer 200 are positioned more accurately, and connection strength is higher.

The first magnet 51 and the second magnet 2001 may be permanent magnets (also referred to as hard magnets), or may be soft magnets (for example, electromagnets). In an embodiment of this application, the second magnet 2001 is an electromagnet, and a Hall switch is disposed in the tablet computer. When the first magnet 51 enters a sensing range of the Hall switch, the Hall switch sends a signal to a control circuit of the second magnet 2001, so that the control circuit of the second magnet 2001 is powered on, to magnetize the second magnet 2001.

An embodiment of this application further includes an electronic component, including the connector according to any one of the foregoing technical solutions. The electronic component may be a keyboard in a two-in-one computer, or may be a keyboard in the two-in-one computer. When the electronic component is connected to another electronic component, the connector can ensure that the two electronic components are connected reliably.

In the descriptions of this specification, the described specific features, structures, materials, or characteristics may be combined in a proper manner in any one or more of the embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A connector, configured to connect a first electronic component and a second electronic component, the connector comprising:
    an enclosure, wherein a through-hole is disposed on the enclosure;
    a pin assembly disposed in the enclosure, wherein the pin assembly is movable relative to the enclosure, the pin assembly comprises a fixing frame, and a pin is disposed on the fixing frame;
    a flexible printed circuit board, wherein one end of the flexible printed circuit board is connected to the pin, and another end of the flexible printed circuit board is configured to be connected to a circuit board in the first electronic component;
    a plug structure configured to be detachably connected to the second electronic component; and
    a driving assembly, wherein when the second electronic component is connected to the plug structure, the driving assembly is configured to drive the pin assembly to move relative to the enclosure in a direction close to the through-hole, so that the pin extends out of the through-hole and is connected to the second electronic component,
    wherein the driving assembly comprises a first magnet fixed on the fixing frame; the first magnet is configured to match a second magnet in the second electronic component the through-hole is opened on an upper cover of the enclosure; and when the second electronic component is connected to the plug structure, attractive force between the first magnet and the second magnet is able to drive the first magnet and the pin assembly to move close to the through-hole, and
    wherein a magnetic attraction component is disposed on a position that is corresponding to the first magnet and that is on a lower cover of the enclosure; and when the second electronic component is connected to the plug structure, the attractive force between the first magnet and the second magnet is greater than attractive force between the first magnet and the magnetic attraction component.

2. The connector according to claim 1, wherein an elastic component is disposed between the pin assembly and the enclosure; one end of the elastic component is connected to the upper cover of the enclosure, and another end of the elastic component is connected to the fixing frame; and when the pin on the fixing frame extends out of the through-hole, the elastic component is in a compressed state.

3. The connector according to claim 1, wherein an elastic component is disposed between the pin assembly and the enclosure; one end of the elastic component is connected to the lower cover of the enclosure, and another end of the elastic component is connected to the fixing frame; and when the pin on the fixing frame extends out of the through-hole, the elastic component is in a stretched state.

4. The connector according to claim 1, wherein a linear guide structure is disposed in the enclosure, and the linear guide structure is configured to guide the fixing frame in moving in a direction perpendicular to the upper cover.

5. The connector according to claim 4, wherein the linear guide structure comprises a guide frame fixed on a lower surface of the upper cover, a side wall of the guide frame extends in a direction perpendicular to the upper cover, and the fixing frame is disposed in and matches the guide frame.

6. The connector according to claim 1, wherein the fixing frame is hinged to the enclosure by a rotating shaft, and the driving assembly is configured to drive the fixing frame to rotate close to the through-hole and is configured to drive the fixing frame to rotate away from the through-hole.

7. The connector according to claim 1, wherein the plug structure comprises a limiting rod disposed on the fixing frame, the limiting rod is in parallel with the pin, and a length of the limiting rod is greater than a length of the pin.

8. The connector according to claim 1, wherein the plug structure comprises a positioning groove disposed on the upper cover, the pin is disposed in the positioning grove, and the positioning groove is configured to match a lower end of the second electronic component.

9. The connector according to claim 1, wherein the second magnet is an electromagnet; a Hall switch is disposed in the second electronic component; and when the first magnet enters a sensing range of the Hall switch, the Hall switch sends a signal to a control circuit of the electromagnet, so that the control circuit of the electromagnet is powered on.

10. An electronic component, comprising the connector according to claim 1.

11. An electronic device, comprising:
a first electronic component; and
a second electronic component, wherein the first electronic component and the second electronic component are connected via a connector, wherein the connector comprises:
an enclosure, wherein a through-hole is disposed on the enclosure;
a pin assembly disposed in the enclosure, wherein the pin assembly is movable relative to the enclosure, the pin assembly comprises a fixing frame, and a pin is disposed on the fixing frame;
a flexible printed circuit board, wherein one end of the flexible printed circuit board is connected to the pin, and another end of the flexible printed circuit board is configured to be connected to a circuit board in the first electronic component;
a plug structure configured to be detachably connected to the second electronic component; and
a driving assembly, wherein when the second electronic component is connected to the plug structure, the driving assembly is configured to drive the pin assembly to move relative to the enclosure in a direction close to the through-hole, so that the pin extends out of the through-hole and is connected to the second electronic component,
wherein the driving assembly comprises a first magnet fixed on the fixing frame; the first magnet is configured to match a second magnet in the second electronic component the through-hole is opened on an upper cover of the enclosure; and when the second electronic component is connected to the plug structure, attractive force between the first magnet and the second magnet is able to drive the first magnet and the pin assembly to move close to the through-hole;
wherein a magnetic attraction component is disposed on a position that is corresponding to the first magnet and that is on a lower cover of the enclosure; and when the second electronic component is connected to the plug structure, the attractive force between the first magnet and the second magnet is greater than attractive force between the first magnet and the magnetic attraction component.

12. The electronic device according to claim 11, wherein the first electronic component includes the connector.

13. The electronic device according to claim 11, wherein the first electronic component is a keyboard, and the second electronic component is a tablet computer; or the first electronic component is a tablet computer, and the second electronic component is a keyboard.

14. The electronic device according to claim 11, wherein an elastic component is disposed between the pin assembly and the enclosure; one end of the elastic component is connected to the upper cover of the enclosure, and another end of the elastic component is connected to the fixing frame; and when the pin on the fixing frame extends out of the through-hole, the elastic component is in a compressed state.

15. The electronic device according to claim 11, wherein an elastic component is disposed between the pin assembly and the enclosure; one end of the elastic component is connected to the lower cover of the enclosure, and another end of the elastic component is connected to the fixing frame; and when the pin on the fixing frame extends out of the through-hole, the elastic component is in a stretched state.

16. The electronic device according to claim 11, wherein a linear guide structure is disposed in the enclosure, and the linear guide structure is configured to guide the fixing frame in moving in a direction perpendicular to the upper cover.

17. The electronic device according to claim 16, wherein the linear guide structure comprises a guide frame fixed on a lower surface of the upper cover, a side wall of the guide frame extends in a direction perpendicular to the upper cover, and the fixing frame is disposed in and matches the guide frame.

18. The electronic device according to claim 11, wherein the fixing frame is hinged to the enclosure by a rotating shaft, and the driving assembly is configured to drive the fixing frame to rotate close to the through-hole and is configured to drive the fixing frame to rotate away from the through-hole.

19. The electronic device according to claim 11, wherein the plug structure comprises a limiting rod disposed on the fixing frame, the limiting rod is in parallel with the pin, and a length of the limiting rod is greater than a length of the pin.

20. The electronic device according to claim 11, wherein the plug structure comprises a positioning groove disposed on the upper cover, the pin is disposed in the positioning groove, and the positioning groove is configured to match a lower end of the second electronic component.

* * * * *